(12) United States Patent
Toda

(10) Patent No.: US 11,739,717 B2
(45) Date of Patent: Aug. 29, 2023

(54) ENGINE

(71) Applicant: YANMAR POWER TECHNOLOGY CO., LTD., Osaka (JP)

(72) Inventor: Ryohei Toda, Fukuoka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

(21) Appl. No.: 17/766,099

(22) PCT Filed: Feb. 19, 2021

(86) PCT No.: PCT/JP2021/006382
§ 371 (c)(1),
(2) Date: Apr. 1, 2022

(87) PCT Pub. No.: WO2021/182075
PCT Pub. Date: Jun. 19, 2021

(65) Prior Publication Data
US 2022/0364532 A1 Nov. 17, 2022

(30) Foreign Application Priority Data
Mar. 13, 2020 (JP) ................................ 2020-044061

(51) Int. Cl.
*F02M 26/30* (2016.01)
*F02M 26/12* (2016.01)
(Continued)

(52) U.S. Cl.
CPC ............ *F02M 26/30* (2016.02); *F02M 26/12* (2016.02); *F02M 26/28* (2016.02); *F02M 26/32* (2016.02); *F02M 26/41* (2016.02)

(58) Field of Classification Search
CPC ........ F02M 26/30; F02M 26/12; F02M 26/28; F02M 26/32; F02M 26/41
See application file for complete search history.

(56) References Cited

U.S. PATENT DOCUMENTS

| 4,258,687 A | * | 3/1981 | Mauch | F02M 26/32 |
| | | | | 123/184.33 |
| 9,856,831 B2 | * | 1/2018 | Yang | F02M 26/30 |

(Continued)

FOREIGN PATENT DOCUMENTS

| BR | 102017006089 A2 | * | 10/2017 | ............. F01P 11/04 |
| DE | 10119484 A1 | * | 10/2002 | ............. F02M 26/32 |

(Continued)

OTHER PUBLICATIONS

International Search Report and Written Opinion for PCT Patent App. No. PCT/JP2021/006392 (Apr. 27, 2021).

*Primary Examiner* — Hung Q Nguyen
(74) *Attorney, Agent, or Firm* — Cermak Nakajima & McGowan LLP; Tomoko Nakajima

(57) ABSTRACT

An EGR cooler 5 is attached to an engine 1 via a bracket 6. The bracket 6 has an exhaust introduction path 65 for introducing some exhaust discharged from a cylinder head 11 to the EGR cooler 5, an exhaust recirculation path 66 for recirculating exhaust that has passed through the EGR cooler 5 toward the engine 1, a cooling water introduction path 67 for introducing cooling water from cooling water supply parts (3, 13-15) to the EGR cooler 5, and a cooling water recirculation path 68 for recirculating cooling water that has passed through the EGR cooler 5 to the cooling water supply parts.

8 Claims, 6 Drawing Sheets

(51) Int. Cl.
*F02M 26/28* (2016.01)
*F02M 26/32* (2016.01)
*F02M 26/41* (2016.01)

(56) References Cited

U.S. PATENT DOCUMENTS

| | | | |
|---|---|---|---|
| 11,002,174 B2 | 5/2021 | Onodera | |
| 2006/0005791 A1* | 1/2006 | Obidi | F02M 26/28 |
| | | | 123/41.44 |
| 2011/0315129 A1* | 12/2011 | Kojima | F02M 26/25 |
| | | | 123/568.12 |
| 2015/0059715 A1* | 3/2015 | Forshier | B22D 19/0072 |
| | | | 123/568.12 |
| 2017/0276095 A1 | 9/2017 | Beyer et al. | |
| 2017/0328313 A1* | 11/2017 | Chu | F01P 5/10 |
| 2019/0063381 A1* | 2/2019 | Ito | F02M 26/28 |

FOREIGN PATENT DOCUMENTS

| | | | | |
|---|---|---|---|---|
| DE | 102010051032 A1 | * | 7/2011 | ............ F01P 11/04 |
| EP | 2848798 A1 | * | 3/2015 | ............ F02M 26/12 |
| EP | 3232043 A1 | | 10/2017 | |
| FR | 2875540 A1 | * | 3/2006 | ............... F01P 3/20 |
| FR | 2894295 A1 | * | 6/2007 | ............ F02M 26/32 |
| FR | 2920706 A1 | * | 3/2009 | ............ F02M 26/26 |
| FR | 3049981 A1 | * | 10/2017 | ............. F02F 1/243 |
| FR | 3063772 A1 | * | 9/2018 | ............ F02M 26/26 |
| JP | 2001132556 A | * | 5/2001 | ............ F02M 26/30 |
| JP | 2004-346916 A | | 12/2004 | |
| JP | 2006-307759 A | | 11/2006 | |
| JP | 2007-292012 A | | 11/2007 | |
| JP | 2009068343 A | * | 4/2009 | ............. F02B 77/11 |
| JP | 2012047154 A | * | 3/2012 | |
| JP | 2017-187006 A | | 10/2017 | |
| JP | 2018-123718 A | | 8/2018 | |
| KR | 100844565 B1 | * | 7/2008 | |
| KR | 20180059876 A | * | 6/2018 | |
| KR | 20190057150 A | * | 5/2019 | |
| WO | WO-2007003303 A1 | * | 1/2007 | ............... F01P 3/12 |
| WO | WO-2018139003 A1 | * | 8/2018 | ............... F01P 3/02 |

* cited by examiner

ENGINE

This application is a national phase entry under 35 U.S.C. § 371 of PCT Patent Application No. PCT/JP2021/006382, filed on Feb. 19, 2021, which claims priority under 35 U.S.C. § 119 to Japanese Patent Application No. 2020-044061, filed Mar. 13, 2020, all of which are incorporated by reference.

TECHNICAL FIELD

The present invention relates to an engine to which an EGR device and an EGR cooler are mounted.

BACKGROUND ART

For example, Patent Literature 1 describes that an EGR device is attached to a cylinder head of an engine on the right side of an intake manifold and an EGR cooler is directly attached to the front side of the cylinder head via a gasket.

The cylinder head is provided with a cooling water extraction port, a cooling water return port, an EGR gas extraction port, and an EGR gas return port, which are located at predetermined positions collectively on the front side of the cylinder head.

On the other hand, the EGR cooler is provided with a cooling water inlet, a cooling water outlet, an EGR gas inlet, and an EGR gas outlet, which are located collectively on one side (or a mounting surface) of the EGR cooler.

The cooling water extraction port, the cooling water return port, the EGR gas extraction port and the EGR gas return port of the cylinder head are respectively and correspondingly connected to the cooling water inlet, the cooling water outlet, the EGR gas inlet and the EGR gas outlet of the EGR cooler, and in this state, the EGR cooler is attached by bolts to the cylinder head.

CITATION LIST

Patent Literature

Patent Literature 1: Japanese Unexamined Patent Publication No. 2018-123718

DISCLOSURE OF INVENTION

Problems to be Solved by the Invention

In the above conventional example, if the EGR cooler becomes obstructive in a correlation between the engine and its installation location, it is necessary to change the mounting position of the EGR cooler mounted to the engine. In that case, a cylinder head and/or a cylinder block of the engine will have to be redesigned.

The object of the present invention is to increase the degree of freedom of the mounting position of an EGR cooler, in an engine to which an EGR device and an EGR cooler are mounted, without forcing design changes to a cylinder head and/or a cylinder block.

Means for Solving the Problems

The present invention relates to an engine to which an EGR device and an EGR cooler are mounted, characterized in that the EGR cooler is mounted on the engine via a bracket, and the bracket is provided with an exhaust introduction path for introducing exhaust gas into the EGR cooler; an exhaust return path for returning exhaust gas that has passed through the EGR cooler to the engine; a cooling water introduction path for introducing cooling water from a cooling water supply part to the EGR cooler; and a cooling water return path for returning cooling water that has passed through the EGR cooler to the cooling water supply part.

In this configuration, since the EGR cooler is indirectly mounted on the engine via the bracket, it is possible to, for example, mount the EGR cooler at an arbitrary position on the engine by devising the shape of the bracket, etc., and thus to increase the degree of freedom in the layout of the EGR cooler.

Now, it is preferable, in the above engine, that the cylinder head is provided with an exhaust extraction channel for directing a part of the exhaust gas discharged into an exhaust manifold to a surface other than a mounting surface for the exhaust manifold; and an exhaust relay channel for sending the exhaust gas that has passed through the EGR cooler to the EGR device, wherein an outlet of the exhaust extraction channel is connected to an inlet of the exhaust introduction path through an exhaust introduction pipe, and an outlet of the exhaust return path is connected to an inlet of the exhaust relay channel through an exhaust return pipe.

In this configuration, since the exhaust introduction pipe and the exhaust return pipe are used, it is possible to, for example, mount the EGR cooler at an arbitrary position on the engine without restricting the shape of the bracket, etc., and thus to easily increase the degree of freedom in the layout of the EGR cooler.

In the above engine, it is also preferable that a part of the exhaust introduction pipe is located further away from the engine than the exhaust return pipe.

According to this configuration, for example, the heat of the engine is less likely to be transferred to the exhaust gas introduced from the engine to the exhaust introduction path of the bracket. This gives an advantage in keeping the temperature of the exhaust gas introduced to the EGR cooler as low as possible.

In the above engine, it is also preferable that the bracket is attached to a lateral face of a cylinder block, and at least one of an inlet of the exhaust introduction path and an outlet of the exhaust return path is provided in an upper part of the bracket.

According to this configuration, the design of the bracket is simplified, in comparison with a configuration such as the conventional example in which the cooling water extraction port, the cooling water return port, the EGR gas extraction port and the EGR gas return port are provided collectively on one side of the cylinder head.

Also, according to the above configuration, the workability of connecting at least one of the inlet of the exhaust introduction path and the outlet of the exhaust return path with a pipe corresponding thereto (i.e., at least one of the exhaust introduction pipe and the exhaust return pipe) is improved.

Furthermore, the above configuration allows the exhaust gas discharged from the engine to pass through the exhaust introduction path of the bracket from top to bottom, and the exhaust gas having passed through the EGR cooler to pass through the exhaust return path of the bracket from bottom to top, which gives an advantage in smoothly circulating the exhaust gas.

In the above engine, it is also preferable that at least one of the cooling water introduction path and the cooling water return path is provided in the bracket closer to the engine than the exhaust introduction path and the exhaust return path.

In this configuration, the heat of the engine is less likely to be transferred to the EGR cooler as well as to the exhaust gas passing through the exhaust introduction path and exhaust return path of the bracket. This gives an advantage in increasing the cooling efficiency of the EGR cooler for the exhaust gas.

In the above engine, it is also preferable that a cylinder block is provided with a water jacket for cooling a cylinder bore; a drainage channel for draining cooling water from the water jacket to an outside; an inflow channel for directing cooling water from an outside to the water jacket; and a water pump for feeding cooling water introduced into the inflow channel toward a downstream side, wherein the cooling water supply part comprises the water jacket, the drainage channel, the inflow channel, and the water pump.

In this configuration, the cooling water used in the engine is effectively used as the cooling water for the EGR cooler, and thereby it is possible to simplify the configuration.

Also, according to the above configuration, it is possible to let the cooling water flow from the EGR cooler to the inflow channel of the cylinder block more efficiently due to the suction force of the water pump, in comparison with a configuration in which, for example, cooling water having passed through an EGR cooler is returned to an external radiator.

In the above engine, it is also preferable that an outlet of the drainage channel of the cylinder block is provided on a mounting surface for the bracket, an inlet of the cooling water introduction path of the bracket is provided on a mounting surface for the cylinder block, and the inlet of the cooling water introduction path is connected to the outlet of the drainage channel.

In this configuration, the design of the bracket is simplified, in comparison with a configuration such as the conventional example in which the cooling water extraction port, the cooling water return port, the EGR gas extraction port and the EGR gas return port are provided collectively on one side of the cylinder head.

Also, according to the above configuration, a pipe separate from the engine no longer needs to be used to connect the inlet of the cooling water introduction path of the bracket to the outlet of the drainage channel of the cylinder block, which gives an advantage in preventing a rise in the cost of equipment.

In the above engine, it is also preferable that an outlet of the cooling water return path of the bracket is provided on a lateral face different from the mounting surface for the cylinder block, and the outlet of the cooling water return path is connected to an inlet of the inflow channel through a cooling water return pipe.

According to this configuration, the design of the bracket is simplified, in comparison with a configuration such as the conventional example in which the cooling water extraction port, the cooling water return port, the EGR gas extraction port and the EGR gas return port are provided collectively on one side of the cylinder head. In addition, the exhaust introduction pipe, the exhaust return pipe, and the cooling water return pipe can be laid out with room of spare.

Effect of the Invention

The engine according to the present invention makes it possible to increase the degree of freedom of the mounting position of the EGR cooler, without forcing design changes to the cylinder head and/or the cylinder block.

DESCRIPTION OF EMBODIMENTS

Figure 1:
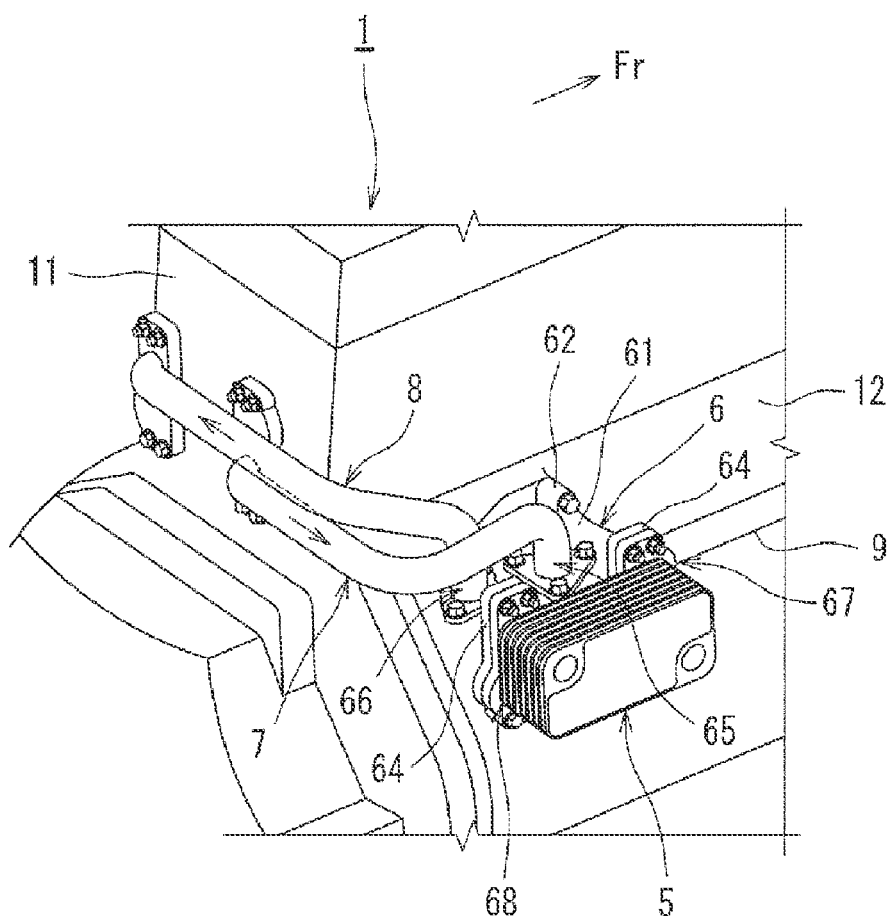
FIG. 1 is a simplified perspective view depicting one embodiment of an engine according to the present invention.

The best embodiment for implementing the present invention will be described in detail below with reference to the accompanying drawings.

An embodiment of the present invention is depicted in FIGS. 1 to 9. In the drawings, "Fr" indicates the front side of an engine 1.

The engine 1 according to this embodiment is a water-cooled engine in which a cylinder head 11 and a cylinder block 12 are cooled by cooling water.

Figure 3:
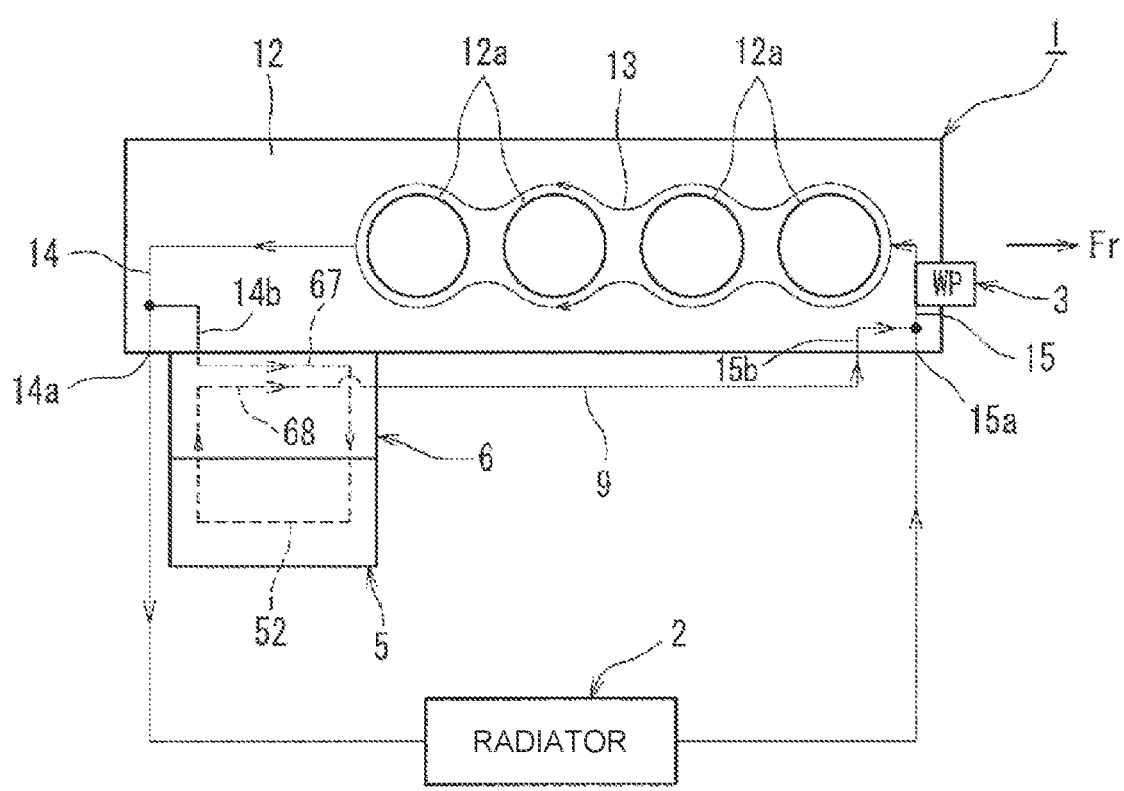
FIG. 3 is a diagram schematically depicting a flow line of cooling water between the engine and the EGR cooler.

The cylinder block 12 is provided with a water jacket 13, a drainage channel 14, an inflow channel 15, and a water pump 3, as depicted in FIG. 3. The water jacket 13, drainage channel 14, inflow channel 15 and water pump 3 constitute a cooling water supply part described in the claims.

The water jacket 13 is designed to cool cylinder bores 12a. The drainage channel 14 is designed to drain the cooling water from the water jacket 13 to a radiator 2. The outlet 14a of the drainage channel 14 is located near the rear end of the right side of the cylinder block 12.

The inflow channel 15 is designed to direct the cooling water having passed through a radiator 2 to the water jacket 13. The inlet 15a of the inflow channel 15 is located near the front end of the right side of the cylinder block 12.

The water pump 3 is designed to feed the cooling water introduced into the inflow channel 15 toward a downstream side.

Figure 2:
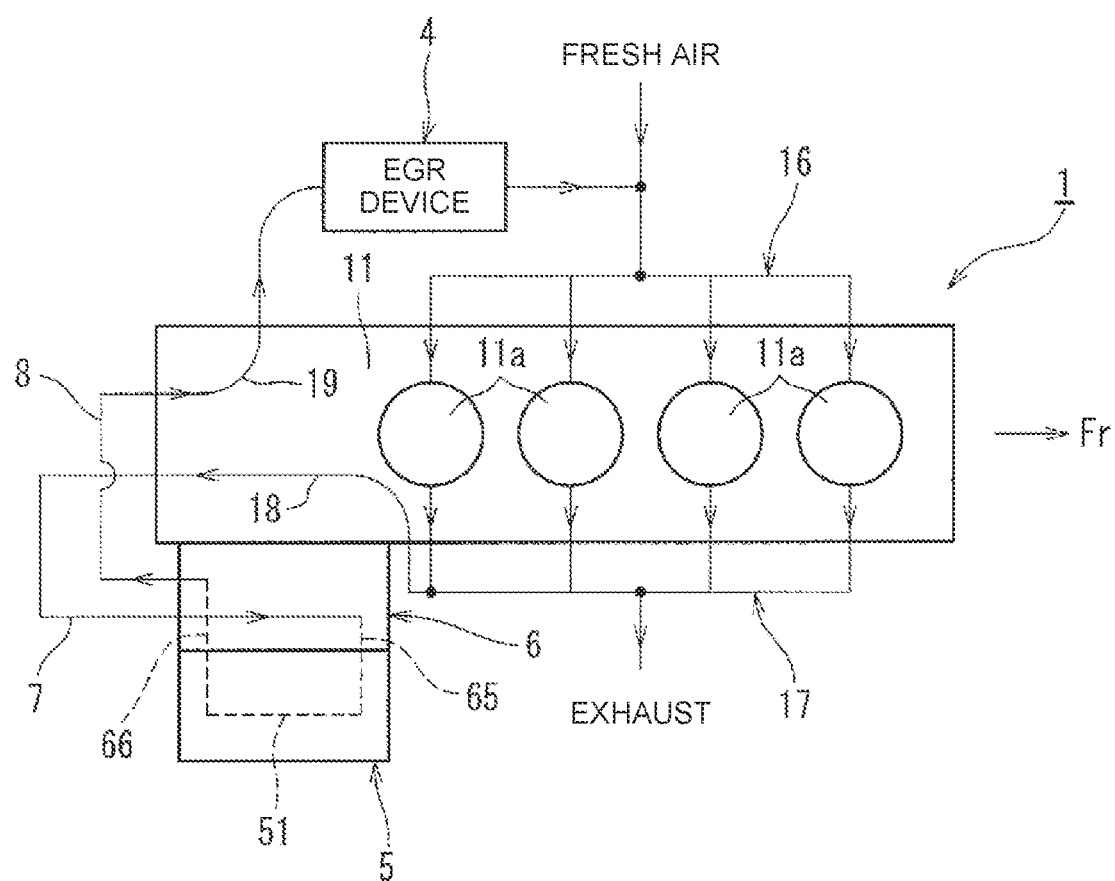
FIG. 2 is a diagram schematically depicting a flow line of exhaust gas between the engine and an EGR cooler.

As depicted in FIG. 2, an EGR device 4 and an EGR cooler 5 are mounted in the water-cooled engine 1.

Since the EGR device 4 is well known, the detailed configuration thereof is not depicted in the drawings. The EGR device 4 is configured to supply a part of the exhaust gas discharged from combustion chambers 11a of the engine 1 to an intake manifold 16.

The EGR device 4 is mounted on the left side of the cylinder head 11 near the rear end thereof (i.e., a side to which the intake manifold 16 is attached).

Since the EGR cooler 5 is well known, the detailed configuration thereof is not depicted in the drawings. The EGR cooler 5 is configured to cool a part of the exhaust gas discharged from the cylinder head 11 to an exhaust manifold 17 and supply it to the EGR device 4.

The EGR cooler 5 is mounted to the right side of the cylinder block 12 of the engine 1 near the rear end thereof (i.e., a side to which the exhaust manifold 17 is attached) via a bracket 6. As depicted in FIGS. 2 and 3, an exhaust flow path 51 and a cooling water flow path 52 are provided inside the EGR cooler 5.

Figure 6:
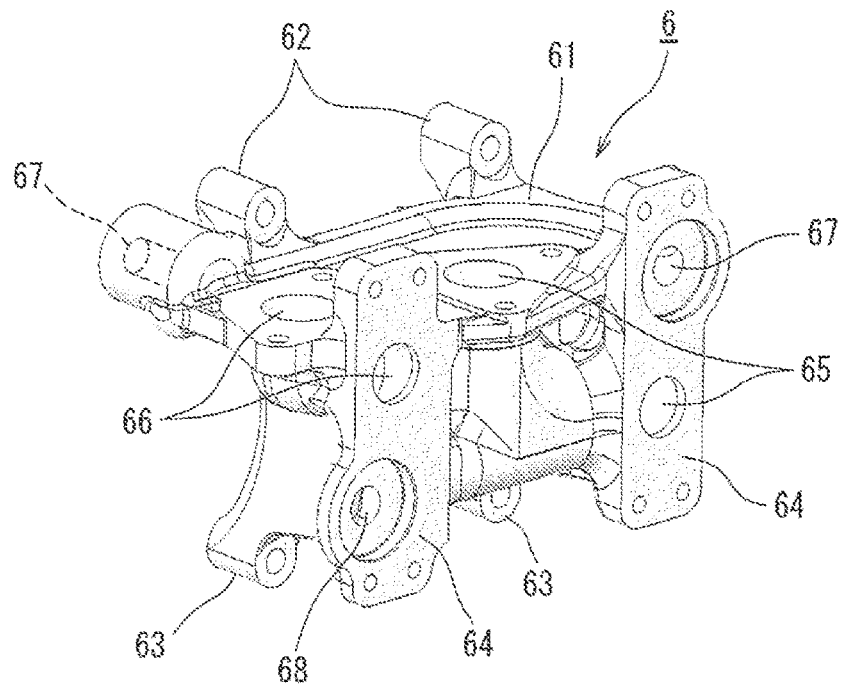
FIG. 6 is a perspective view depicting only a bracket in FIG. 1 from diagonally above.
Figure 7:
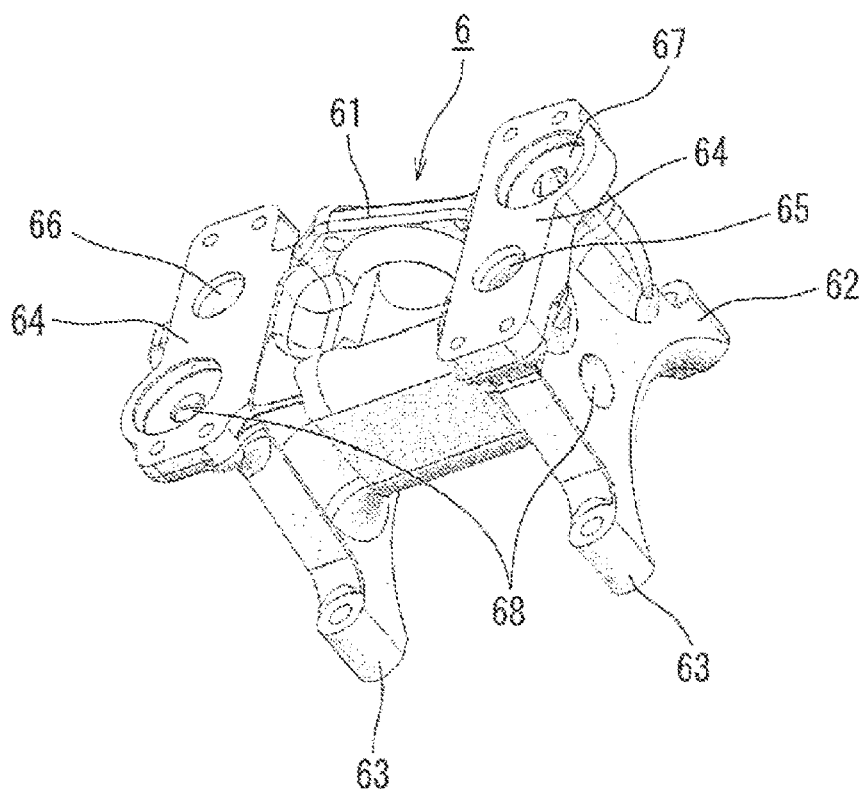
FIG. 7 is a perspective view depicting only the bracket in FIG. 1 from diagonally below.

As will be explained in detail later, the bracket 6 has a configuration wherein a bracket body 61 is provided with upper attachment pieces 62, lower attachment pieces 63, and mount bases 64, as depicted in FIGS. 6 and 7.

The bracket body 61 is attached to the surface (or right side) of the cylinder block 12, to which the exhaust manifold 17 is attached, by means of bolts, etc., not depicted.

The upper attachment pieces 62 and the lower attachment pieces 63 are provided at four locations, i.e., the upper left, upper right, lower left and lower right locations, on the surface (or front side) of the bracket body 61, which is adapted to be attached to the cylinder block 12. Each of the attachment pieces 62, 63 is provided with an insertion hole (not designated by a reference sign) for the aforementioned bolt.

The mount bases 64 are provided at two locations, i.e., the left and right locations, on the rear side of the bracket body 61. Each of the mount bases 64 is provided with an insertion hole (not designated by a reference sign) used for fixing the EGR cooler 5 with bolts (not designated by a reference sign).

An EGR passage (not designated by a reference sign) and a cooling water passage (not designated by a reference sign) are provided between the engine 1 and the EGR device 4, and will be explained in detail below.

As depicted in FIG. 2, the EGR passage is a passage for making a part of the exhaust gas, having discharged from the engine 1, pass through the EGR cooler 5 and thereafter sending it to the EGR device 4, and includes an exhaust extraction channel 18 of the cylinder head 11, an exhaust introduction pipe 7, an exhaust introduction path 65 of the bracket 6, an exhaust return path 66 of the bracket 6, an exhaust return pipe 8, and an exhaust relay channel 19 of the cylinder head 11.

As depicted in FIG. 3, the cooling water passage is a passage for making the cooling water, having passed through the water jacket 13 in the engine 1, pass through the EGR cooler 5 and thereafter returning it to the engine 1, and includes a cooling water introduction path 67 of the bracket 6, a cooling water return path 68 of the bracket 6, and a cooling water return pipe 9 that is separate from the engine 1.

Each element constituting the EGR passage and each element constituting the cooling water passage are described in detail below.

As depicted in FIG. 2, the cylinder head 11 is provided with the exhaust extraction channel 18 and the exhaust relay channel 19.

The exhaust extraction channel 18 is designed to direct a part of the exhaust gas discharged into the exhaust manifold 17, from the right side surface of the cylinder head 11 (i.e., a mounting surface for the exhaust manifold 17) to the rear end surface thereof.

The exhaust relay channel 19 is designed to direct the exhaust gas, having passed through the EGR cooler 5, from the rear end surface of the cylinder head 11 to the left side surface thereof (i.e., a mounting surface for the EGR device 4).

Figure 4:
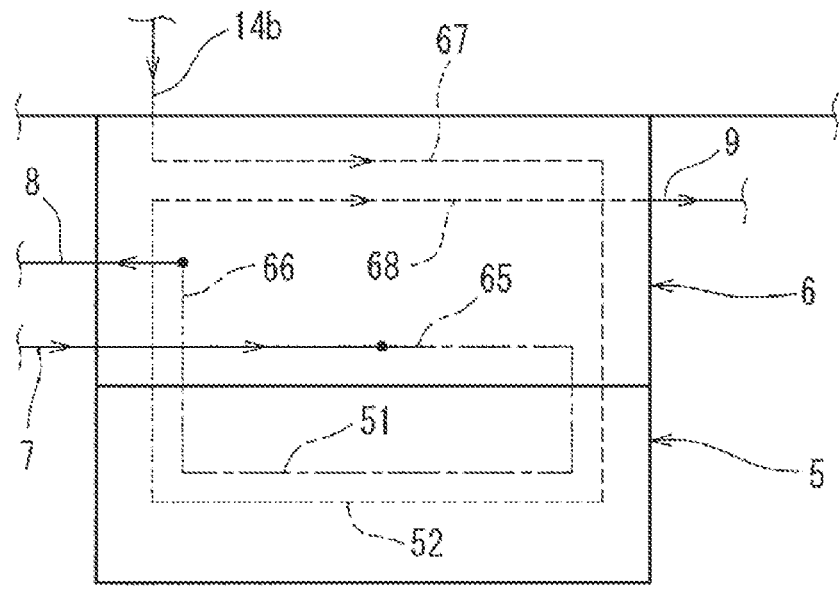
FIG. 4 is a diagram schematically depicting a positional relationship between an exhaust introduction path, an exhaust return path, a cooling water introduction path and a cooling water return path in a bracket.
Figure 5:
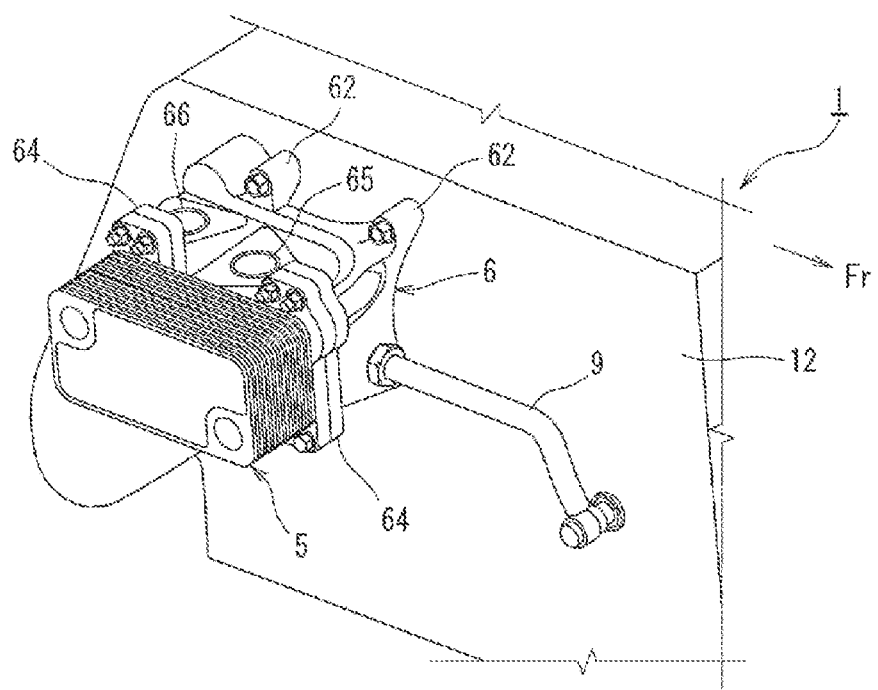
FIG. 5 is an enlarged perspective view depicting the EGR cooler in FIG. 1.

As depicted in FIGS. 4, 6 and 7, the bracket body 61 is provided with an exhaust introduction path 65, an exhaust return path 66, a cooling water introduction path 67, and a cooling water return path 68.

The bracket body 61 of this embodiment does not have a simple rectangular shape, but the portion thereof, where the exhaust introduction path 65, the exhaust return path 66, the cooling water introduction path 67 and the cooling water return path 68 are not formed, is suitably recessed so as to reduce weight.

The exhaust introduction path 65 is a passage that directs the exhaust gas discharged from the exhaust extraction channel 18 to the exhaust flow path 51 of the EGR cooler 5.

The inlet of the exhaust introduction path 65 is located in the upper part of the bracket body 61 in the middle of a left-right direction. The outlet of the exhaust introduction path 65 is located near the lower end of the right-side mount base 64.

The exhaust return path 66 is a passage that directs the exhaust gas, having passed through the exhaust flow path 51 of the EGR cooler 5, to the exhaust return pipe 8.

The inlet of the exhaust return path 66 is located near the upper end of the left-side mount base 64, and the outlet of the exhaust return path 66 is located near the left end in the upper part of the bracket body 61.

Figure 8:
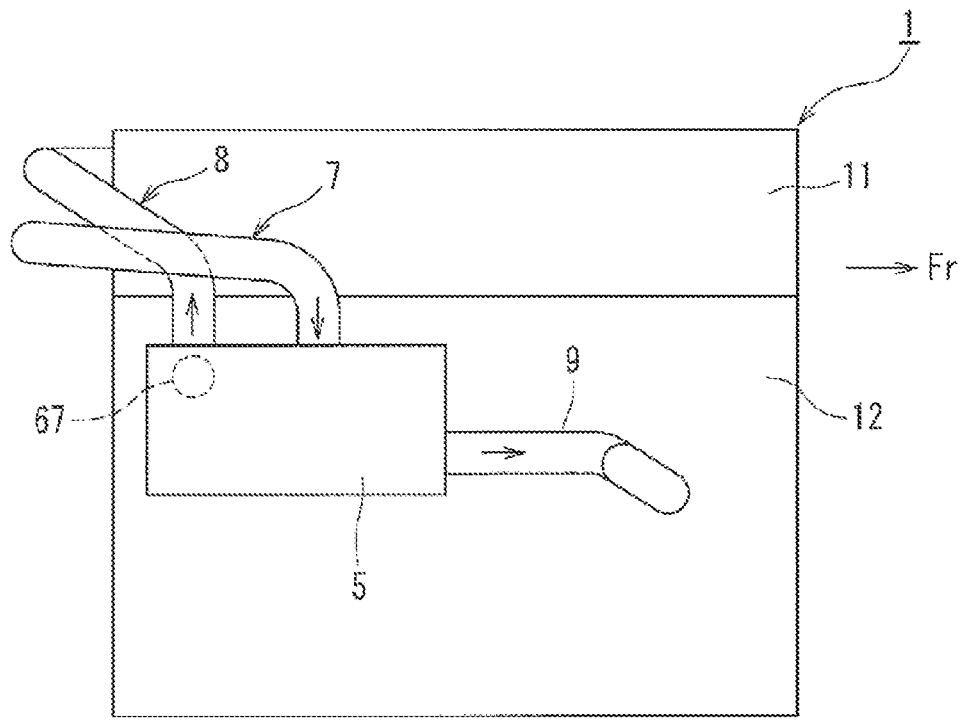
FIG. 8 is a simplified side view depicting a mounting form of the EGR cooler relative to the engine.
Figure 9:
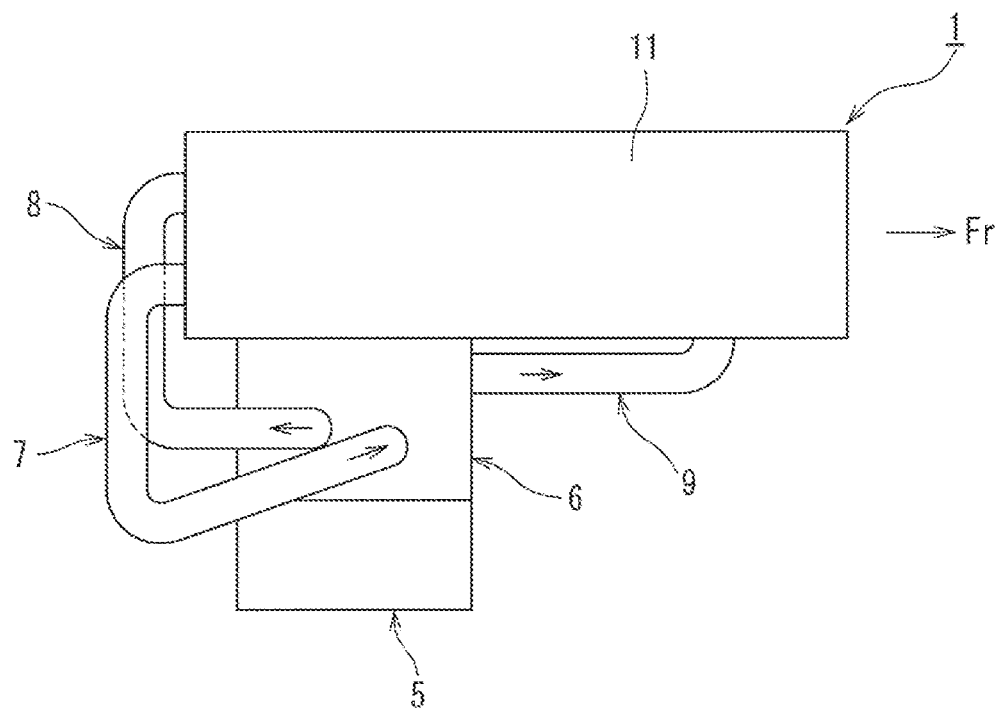
FIG. 9 is a simplified plan view depicting the mounting form of the EGR cooler relative to the engine.

As depicted in FIGS. 1, 8 and 9, the inlet of the exhaust introduction path 65 of the bracket 6 is connected to the outlet of the exhaust extraction channel 18 of the cylinder head 11 through the exhaust introduction pipe 7. On the other hand, the outlet of the exhaust return path 66 of the bracket 6 is connected to the inlet of the exhaust relay channel 19 of the cylinder head 11 through the exhaust return pipe 8.

In this embodiment, as depicted in FIGS. 1 and 9, a part of the exhaust introduction pipe 7 is located farther away from the engine 1 than the exhaust return pipe 8. Specifically, as depicted in FIG. 9, a separation distance between the part of the exhaust introduction pipe 7 and the engine 1 is set larger than the separation distance between the engine 1 and the exhaust return pipe 8.

The cooling water introduction path 67 is a passage for introducing the cooling water discharged from the drainage channel 14 of the cylinder block 12 into the cooling water flow path 52 of the EGR cooler 5.

The inlet of the cooling water introduction path 67 is located on the surface (or front side) of the bracket body 61, which is adapted to be attached to the cylinder block 12, and the outlet of the cooling water introduction path 67 is located near the upper end of the right-side mount base 64. Further, as depicted in FIG. 3, the middle region of the cooling water introduction path 67 has a straight shape extending from the rear to front of the engine 1.

The cooling water return path 68 is a passage for directing the cooling water, having passed through the cooling water flow path 52 of the EGR cooler 5, to the cooling water return pipe 9.

The inlet of the cooling water return path 68 is located near the lower end of the left-side mount base 64, and the outlet of the cooling water return path 68 is located near the lower end of the right side of the bracket body 61, which is perpendicular to the surface (or front side) adapted to be attached to the cylinder block 12. Further, as depicted in FIG. 3, the middle region of the cooling water return path 68 has a straight shape in plan view, extending from the rear to front of the engine 1.

As can be seen from FIGS. 2 and 4, the straight-shaped middle regions of the cooling water introduction path 67 and the cooling water return path 68 are provided in the bracket body 61 closer to the engine 1 than the exhaust introduction path 65 and the exhaust return path 66.

As depicted in FIG. 3, the drainage channel 14 of the cylinder block 12 is provided with an auxiliary drainage channel 14b for sending the cooling water to the EGR cooler 5.

The outlet of the auxiliary drainage channel 14 is located on a surface (or right side) of the cylinder block 12, to which the bracket 6 is attached. On the other hand, the inlet of the cooling water introduction path 67 of the bracket 6 is located on a mounting surface (or front side) of the bracket 6 for the cylinder block 12.

Thus, as the bracket 6 is attached to the cylinder block 12, the inlet of the cooling water introduction path 67 of the bracket 6 is directly connected to the outlet of the auxiliary drainage channel 14b of the cylinder block 12. Although not depicted, a suitable sealing member is interposed at a connection between the outlet of the auxiliary drainage channel 14b of the cylinder block 12 and the cooling water introduction path 67 of the bracket 6.

On the other hand, as depicted in FIG. 3, the inflow channel 15 of the cylinder block 12 is provided with an auxiliary inflow channel 15b for receiving the cooling water that has passed through the EGR cooler 5.

The inlet of the auxiliary inflow channel 15b is located on the surface (or right side) of the cylinder block 12, to which the bracket 6 is attached.

The inlet of the auxiliary inflow channel 15b of the cylinder block 12 is connected with the outlet of the cooling water return path 68 of the bracket 6 through the cooling water return pipe 9. Although not depicted, a suitable sealing member is interposed at a connection between the inlet of the auxiliary inflow channel 15b of the cylinder block 12 and the cooling water return pipe 9.

The exhaust introduction pipe 7 and the exhaust return pipe 8 are made of, e.g., metal, and the cooling water return pipe 9 is made of, e.g., rubber, resin, etc., but the materials of these components are not particularly limited.

The flow lines of the exhaust gas and the cooling water between the engine 1 and the EGR cooler 5 will be explained below.

As depicted in FIG. 2, the exhaust gas discharged from the combustion chambers 11a of the engine 1 is discharged, through exhaust ports (not designated by a reference sign), into the exhaust manifold 17. A part of the exhaust gas discharged into the exhaust manifold 17 is introduced, through the exhaust extraction channel 18 of the cylinder head 11, the exhaust introduction pipe 7, and the exhaust introduction path 65 of the bracket 6, into the exhaust flow path 51 of the EGR cooler 5.

The exhaust gas that has passed through the exhaust flow path 51 of the EGR cooler 5 is introduced, through the exhaust return path 66 of the bracket 6, the exhaust return pipe 8, and the exhaust relay channel 19 of the cylinder head 11, into the EGR device 4, and thereafter is supplied to the intake manifold 16.

On the other hand, as depicted in FIG. 3, the cooling water that has passed through the water jacket 13 of the engine 1 and been discharged from the auxiliary drainage channel 14b is introduced, through the cooling water introduction path 67 of the bracket 6, into the cooling water flow path 52 of the EGR cooler 5.

The cooling water that has passed through the cooling water flow path 52 of the EGR cooler 5 is introduced, through the cooling water return path 68 of the bracket 6 and the cooling water return pipe 9, into the auxiliary inflow channel 15b of the engine 1. The cooling water introduced into the auxiliary inflow channel 15b is mixed in the inflow channel 15 with the cooling water that has passed through the radiator 2, and is sent to the water jacket 13 of the cylinder block 12.

In this way, the exhaust gas and the cooling water are introduced separately from each other into the EGR cooler 5, so that the exhaust gas is cooled by the cooling water.

As explained above, in the embodiment to which the present invention is applied, the EGR cooler 5 is indirectly mounted on the engine 1 via the bracket 6 and the exhaust introduction pipe 7 and the exhaust return pipe 8 are used, so that it is possible to, for example, mount the EGR cooler 5 at an arbitrary position on the engine 1 without forcing design changes to the cylinder head 11 and the cylinder block 12, and thus to increase the degree of freedom in the layout of the EGR cooler 5.

Also in this embodiment, a part of the exhaust introduction pipe 7 is located farther away from the engine 1 than the exhaust return pipe 8, so that, for example, the heat of the engine 1 is less likely to be transferred to the exhaust gas introduced from the engine 1 to the exhaust introduction path 65 of the bracket 6. This gives an advantage in keeping the temperature of the exhaust gas introduced to the bracket 6 and the EGR cooler 5 as low as possible, so that it is possible to prevent the thermal expansion of the bracket 6 and the EGR cooler 5.

Also in this embodiment, the inlet of the exhaust introduction path 65 and the outlet of the exhaust return path 66 are located on the upper part of the bracket 6, so that, in comparison with a configuration such as the conventional example in which the cooling water extraction port, the cooling water return port, the EGR gas extraction port and the EGR gas return port are provided collectively on one side of the cylinder head, it is possible to simplify the design of the bracket, and to improve the workability of connecting the exhaust introduction pipe 7 and the exhaust return pipe 8 to the inlet of the exhaust introduction path 65 and the outlet of the exhaust return path 66. Furthermore, this embodiment allows the exhaust gas discharged from the engine 1 to pass through the exhaust introduction path 65 of the bracket 6 from top to bottom, and the exhaust gas having passed through the EGR cooler 5 to pass through the exhaust return path 66 of the bracket 6 from bottom to top, which gives an advantage in smoothly circulating the exhaust gas.

Also in this embodiment, the cooling water introduction path 67 and the cooling water return path 68 are provided in the bracket 6 closer to the engine 1 than the exhaust introduction path 65 and the exhaust return path 66, so that the heat of the engine 1 is less likely to be transferred to the EGR cooler 5 as well as to the exhaust gas passing through the exhaust introduction path 65 and the exhaust return path 66. This gives an advantage in increasing the cooling efficiency of the EGR cooler 5 for the exhaust gas.

Also in this embodiment, the cooling water that has passed through the EGR cooler 5 is returned to the engine 1, so that it is possible to let the cooling water flow from the EGR cooler 5 to the interior of the engine 1 more efficiently due to the suction force of the water pump 3, in comparison with a configuration in which cooling water having passed through the EGR cooler 5 is returned to the radiator 2.

In this embodiment, the inlet of the cooling water introduction path 67 of the bracket 6 is directly connected to the outlet of the auxiliary drainage channel 14b of the cylinder block 12, and then the outlet of the cooling water return path 68 of the bracket 6 is connected to the inlet of the auxiliary inflow channel 15b of the cylinder block 12 through the cooling water return pipe 9, so that, in comparison with a configuration such as the conventional example in which the cooling water extraction port, the cooling water return port, the EGR gas extraction port and the EGR gas return port are provided collectively on one side of the cylinder head, it is possible to simplify the design of the bracket 6, to give an advantage in preventing a rise in the cost of equipment, and to lay out the exhaust introduction pipe 7, the exhaust return pipe 8 and the cooling water return pipe 9 with room of spare.

Note that the present invention is not limited to the above embodiment, but may be modified as appropriate within the scope of the claims and within the scope of equivalents thereof.

(1) The above embodiment shows an exemplary configuration in which the cooling water introduction path 67 of the bracket 6 is directly connected to the outlet of the auxiliary drainage channel 14b of the cylinder block 12, but the present invention is not limited to such a configuration.

For example, although not depicted, a modified configuration may be provided, in which the cooling water introduction path 67 of the bracket 6 is connected to the outlet of the auxiliary drainage channel 14b of the cylinder block 12 through a cooling water introduction pipe.

(2) The above embodiment shows an exemplary configuration in which both the inlet of the exhaust introduction path 65 and the outlet of the exhaust return path 66 are located at the upper part of the bracket 6, but the present invention is not limited to such a configuration.

For example, although not depicted, a modified configuration may be provided, in which any one of the inlet of the exhaust introduction path 65 and the outlet of the exhaust return path 66 at the upper part of the bracket 6.

(3) The above embodiment shows an exemplary configuration in which the exhaust extraction channel 18 and the exhaust relay channel 19 are provided in the cylinder head 11, but the present invention is not limited to such a configuration.

For example, although not depicted, a modified configuration may be provided, in which the exhaust introduction pipe 7 is directly connected to an exhaust extraction port of a not-depicted exhaust manifold and the exhaust return pipe 8 is directly connected to the EGR device 4, instead of providing the exhaust extraction channel 18 and the exhaust relay channel 19 in the cylinder head 11 as in the above embodiment.

(4) The above embodiment shows an exemplary configuration in which the auxiliary drainage channel 14b is provided for the drainage channel 14 of the cylinder block 12 and the auxiliary inflow channel 15b is provided for the inflow channel 15 of the cylinder block 12, but the present invention is not limited to such a configuration.

For example, although not depicted, a modified configuration may be provided, which does not include the auxiliary drainage channel 14b and the auxiliary inflow channel 15b.

In that case, for example, although not depicted, the cooling water introduction path 67 of bracket 6 may be connected to a delivery tube extending toward the radiator 2, which is connected to the outlet 14a of the drainage channel 14, through a cooling water introduction pipe, and the outlet of the cooling water return pipe 9 may be connected to an introduction tube extending from the radiator 2, which is connected to the inlet 15a of the inflow channel 15.

(5) The shapes, locations, etc., of the water jacket 13, the drainage channel 14 and the inflow channel 15 of the cylinder block 12, depicted in the above embodiment, are merely examples and not particularly limited.

INDUSTRIAL APPLICABILITY

The present invention can be suitably used as an engine to which an EGR device and an EGR cooler are mounted.

The invention claimed is:

1. An engine to which an EGR device and an EGR cooler are mounted, wherein
   the EGR cooler is mounted on the engine via a bracket,
   the bracket is provided with
      an exhaust introduction path for introducing exhaust gas into the EGR cooler;
      an exhaust return path for returning exhaust gas that has passed through the EGR cooler to the engine;
      a cooling water introduction path for introducing cooling water from a cooling water supply part to the EGR cooler; and
      a cooling water return path for returning cooling water that has passed through the EGR cooler to the cooling water supply part;
   wherein the EGR device is mounted on a first side of the engine, and
   the EGR cooler is mounted on a second side which is opposite from the first side of the engine.

2. An engine to which an EGR device and an EGR cooler are mounted,
   wherein
   the EGR cooler is mounted on the engine via a bracket,
   the bracket is provided with
      an exhaust introduction path for introducing exhaust gas into the EGR cooler;
      an exhaust return path for returning exhaust gas that has passed through the EGR cooler to the engine;
      a cooling water introduction path for introducing cooling water from a cooling water supply part to the EGR cooler; and
      a cooling water return path for returning cooling water that has passed through the EGR cooler to the cooling water supply part;
   wherein
   a cylinder head is provided with an exhaust extraction channel for directing a part of the exhaust gas discharged into an exhaust manifold to a surface other than a mounting surface for the exhaust manifold; and an exhaust relay channel for sending the exhaust gas that has passed through the EGR cooler to the EGR device,
   an outlet of the exhaust extraction channel is connected to an inlet of the exhaust introduction path through an exhaust introduction pipe, and
   an outlet of the exhaust return path is connected to an inlet of the exhaust relay channel through an exhaust return pipe.

3. The engine of claim 2, wherein
   a part of the exhaust introduction pipe is located further away from the engine than the exhaust return pipe.

4. The engine of claim 1, wherein
   the bracket is attached to a lateral face of a cylinder block, and
   at least one of an inlet of the exhaust introduction path and an outlet of the exhaust return path is provided in an upper part of the bracket.

5. An engine to which an EGR device and an EGR cooler are mounted,
   wherein
   the EGR cooler is mounted on the engine via a bracket,
   the bracket is provided with
      an exhaust introduction path for introducing exhaust gas into the EGR cooler;
      an exhaust return path for returning exhaust gas that has passed through the EGR cooler to the engine;

a cooling water introduction path for introducing cooling water from a cooling water supply part to the EGR cooler; and a cooling water return path for returning cooling water that has passed through the EGR cooler to the cooling water supply part; and wherein at least one of the cooling water introduction path and the cooling water return path is provided in the bracket closer to the engine than the exhaust introduction path and the exhaust return path.

6. The engine of claim 1, wherein a cylinder block is provided with a water jacket for cooling a cylinder bore; a drainage channel for draining cooling water from the water jacket to an outside; an inflow channel for directing cooling water from an outside to the water jacket; and a water pump for feeding cooling water introduced into the inflow channel toward a downstream side, wherein the cooling water supply part comprises the water jacket, the drainage channel, the inflow channel, and the water pump.

7. The engine of claim 6, wherein an outlet of the drainage channel of the cylinder block is provided on a mounting surface for the bracket, an inlet of the cooling water introduction path of the bracket is provided on a mounting surface for the cylinder block, and the inlet of the cooling water introduction path is connected to the outlet of the drainage channel.

8. The engine of claim 7, wherein an outlet of the cooling water return path of the bracket is provided on a lateral face different from the mounting surface for the cylinder block, and the outlet of the cooling water return path is connected to an inlet of the inflow channel through a cooling water return pipe.

* * * * *